(12) United States Patent
Dickey

(10) Patent No.: US 9,176,890 B2
(45) Date of Patent: Nov. 3, 2015

(54) NON-DISRUPTIVE MODIFICATION OF A DEVICE MAPPER STACK

(71) Applicant: International Business Machines Corporation, Armonk, NY (US)

(72) Inventor: Clement L. Dickey, San Jose, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 217 days.

(21) Appl. No.: 13/912,245

(22) Filed: Jun. 7, 2013

(65) Prior Publication Data

US 2014/0365739 A1     Dec. 11, 2014

(51) Int. Cl.
G06F 12/02     (2006.01)
G06F 12/10     (2006.01)
G06F 3/06      (2006.01)

(52) U.S. Cl.
CPC .............. *G06F 12/10* (2013.01); *G06F 3/0604* (2013.01); *G06F 3/0629* (2013.01); *G06F 12/1009* (2013.01)

(58) Field of Classification Search
CPC .................. G06F 12/1009; G06F 2009/45579; G06F 3/0604; G06F 3/0629
USPC ....................................... 711/6, 203
See application file for complete search history.

(56) References Cited

U.S. PATENT DOCUMENTS

| | | | |
|---|---|---|---|
| 6,282,610 B1 * | 8/2001 | Bergsten | 711/114 |
| 7,890,665 B2 * | 2/2011 | Corry et al. | 710/8 |
| 7,921,262 B1 * | 4/2011 | Dash et al. | 711/154 |
| 8,645,646 B2 * | 2/2014 | Agombar et al. | 711/162 |
| 2005/0120160 A1 | 6/2005 | Plouffe et al. | |
| 2005/0228937 A1 | 10/2005 | Karr et al. | |
| 2008/0005517 A1 | 1/2008 | Choletti et al. | |

FOREIGN PATENT DOCUMENTS

CN     102053929     5/2011

OTHER PUBLICATIONS

Sangster, et al, "Network Endpoint Assessment (NEA): Overview and Requirements," IP.com, Jun. 27, 2008, retrieved from Internet: http://www.ip.com/pubview/IPCOM000172078D; 55 PGS.
Vuletic et al, "Virtual Memory Window for Application-Specific Reconfigurable Coprocessors," Proceedings of 41st Design Automation Conference, Jul. 7-11, 2004, pp. 948-953.
Wadhwa et al, "Protocol for Access node Control Mechanism in Broadband Networks," IP.com, Dec. 1, 2011, retrieved from Internet at http://priorartdatabase.com/IPCOM/000212920; 165 pages.

* cited by examiner

*Primary Examiner* — Than Nguyen
(74) *Attorney, Agent, or Firm* — Cantor Colburn LLP

(57) ABSTRACT

Embodiments relate to non-disruptive modification of a device mapper stack. Aspects include receiving the device mapper stack comprising a first device mapper layer having an active mapping table and creating a second device mapper layer having a copy of the active mapping table from the first device mapper layer. Aspects further include creating an inactive mapping table having a desired mapping logic in the first device mapper layer and suspending and resuming an operation of the first device mapper layer. Suspending and resuming causes the active mapping table of the first device mapper layer to be replaced with the inactive mapping table of the first device mapper layer.

12 Claims, 5 Drawing Sheets

NON-DISRUPTIVE MODIFICATION OF A DEVICE MAPPER STACK

BACKGROUND

The present disclosure relates generally to modification of a device mapper stack, and more specifically, to non-disruptive modification of a device mapper stack.

In the Linux kernel, the device mapper serves as a generic framework to map one device onto another. The device mapper forms the foundation of logical volume management (LVM2), software redundant array of independent disks (RAIDs), multipath, disk encryption, and offers additional features such as file system snapshots. The device mapper works by redirecting or copying data from a virtual device, which is provided by the device mapper, to a target or physical device. If the device mapper creates or otherwise uses a copy of the data, the device mapper operation may modify the data.

In general, in order to insert a device mapper layer into an existing device mapper stack, it must go logically above an existing device mapper layer, but not disrupt the operation of applications that are utilizing the existing device mapper layer. Currently, all device mapper layers are inserted during construction of the device mapper stack, rather than after. However, inserting layers during initial construction of the device mapper stack requires involvement of the system integrator, and is therefore not feasible for systems that have already been deployed.

BRIEF SUMMARY

Embodiments include a method and computer program product for non-disruptive modification of a device mapper stack. Embodiments include receiving the device mapper stack having a first device mapper layer including an active mapping table. Embodiments also include creating a second device mapper layer having a copy of the active mapping table from the first device mapper layer and creating an inactive mapping table having a desired mapping logic in the first device mapper layer. Embodiments further include suspending and resuming an operation of the first device mapper layer. In exemplary embodiments, suspending and resuming causes the active mapping table of the first device mapper layer to be replaced with the inactive mapping table of the first device mapper layer.

Embodiments also include a method for non-disruptive modification of a device mapper stack. Embodiments include receiving a device mapper stack having a first device mapper layer having a modified mapping table and a second device mapper layer having a original mapping table. Embodiments also include copying the original mapping table from the second device mapper layer into the first device mapper layer and storing the original mapping table as an inactive mapping table for the first device mapper layer. Embodiments further include suspending and resuming an operation of the first device mapper layer, wherein the suspending and resuming causes the active mapping table of the first device mapper layer to be replaced with the inactive mapping table of the first device mapper layer. Embodiments also include removing the second device mapper layer from the device mapper stack.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1A:
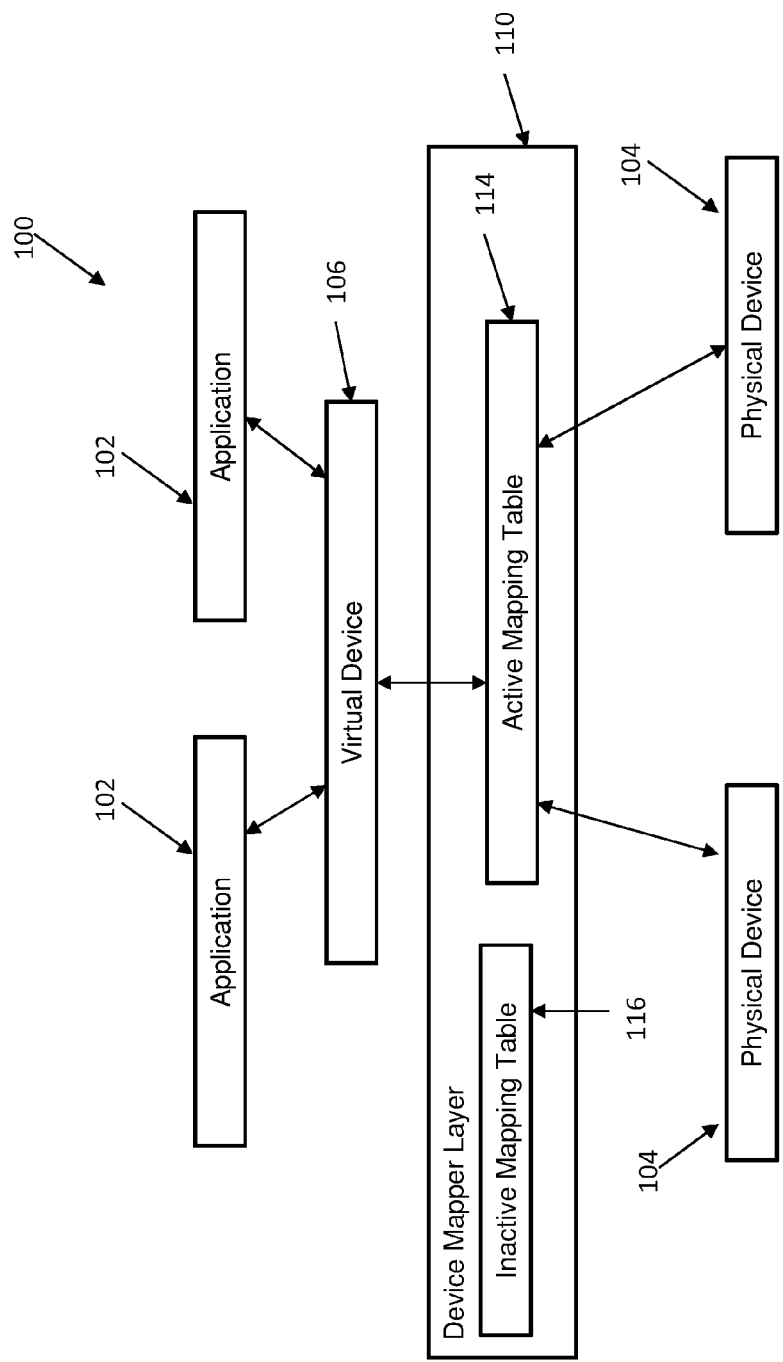
FIG. 1A depicts a block diagram of a device mapper stack having a single device mapper layer in accordance with an exemplary embodiment.
Figure 1B:
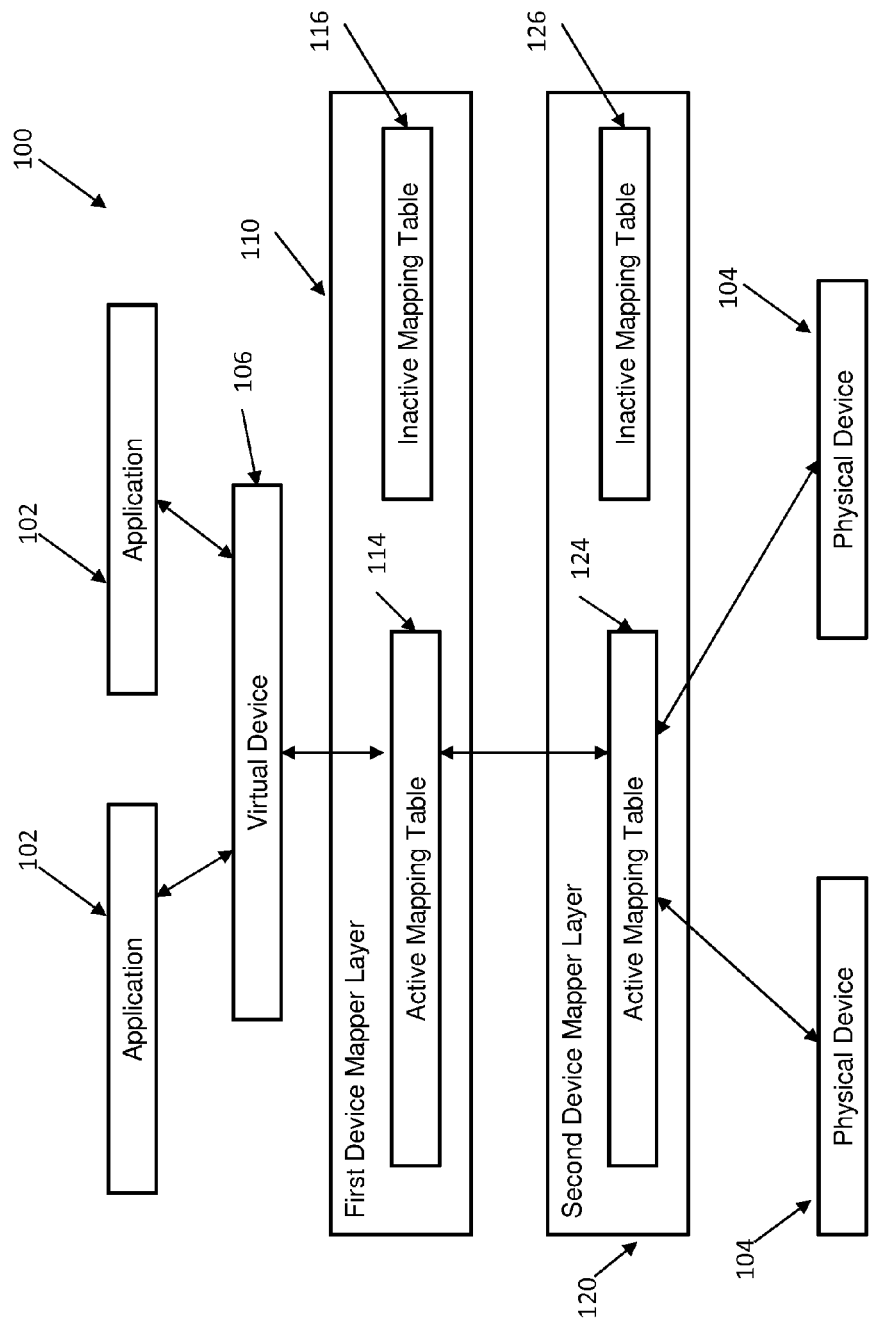
FIG. 1B depicts a block diagram of a device mapper stack having two device mapper layers in accordance with an exemplary embodiment.

Referring now to FIGS. 1A and 1B, block diagrams of device mapper stacks 100 in accordance with exemplary embodiments are shown. As illustrated in FIG. 1A, the device mapper stack 100 includes one or more applications 102 which access a virtual device 106. The virtual device 106 is configured to communicate with one or more physical devices 104 via a device mapper layer 110. In exemplary embodiments, the device mapper layer 110 includes an active mapping table 114 that is configured to map the locations from the virtual device 106 onto the one or more physical devices 104. The device mapper layer 110 also includes an in-active mapping table 116. In exemplary embodiments, the in-active mapping table 116 is a backup mapping table that can be used to replace the active mapping table 114 by suspending and resuming the operation of the device mapper layer 110.

In exemplary embodiments, a device mapper stack 100 of an active system may be modified by using the device mapper ability to copy the device mapper layer 110, to modify the inactive mapping table 116 of the device mapper layer 110, and to exchange the in-active mapping table 116 of device mapper layer 110 with the active mapping table 114 of device mapper layer 110. In exemplary embodiments, a device mapper stack 100 is provided having a single device mapper layer 110, such as the one shown in FIG. 1A, can be converted into device mapper stack 100 having two device mapper layers 110, 120, such as the one shown in FIG. 1B. In exemplary embodiments, modification of the device mapper stack 100 of an active system is configured such that the applications 102 are able to access the physical devices 104 via the virtual device 106 without disruption.

As illustrated in FIG. 1B, a device mapper stack 100 having a first device mapper layer 110 and a second device mapper layer 120 is shown. In exemplary embodiments, the virtual device 106 is configured to communicate with one or more physical devices 104 via both the first device mapper layer 110 and the second device mapper layer 120. In exemplary embodiments, the first device mapper layer 110 includes an active mapping table 114 that is configured to map the locations from the virtual device 106 to locations in the active mapping table 124 of the second device mapper layer 120, which in turn maps to locations one or more physical devices 104. Both the first device mapper layer 110 and second mapper layer 120 may also includes an inactive mapping tables 116, 126.

Figure 2:
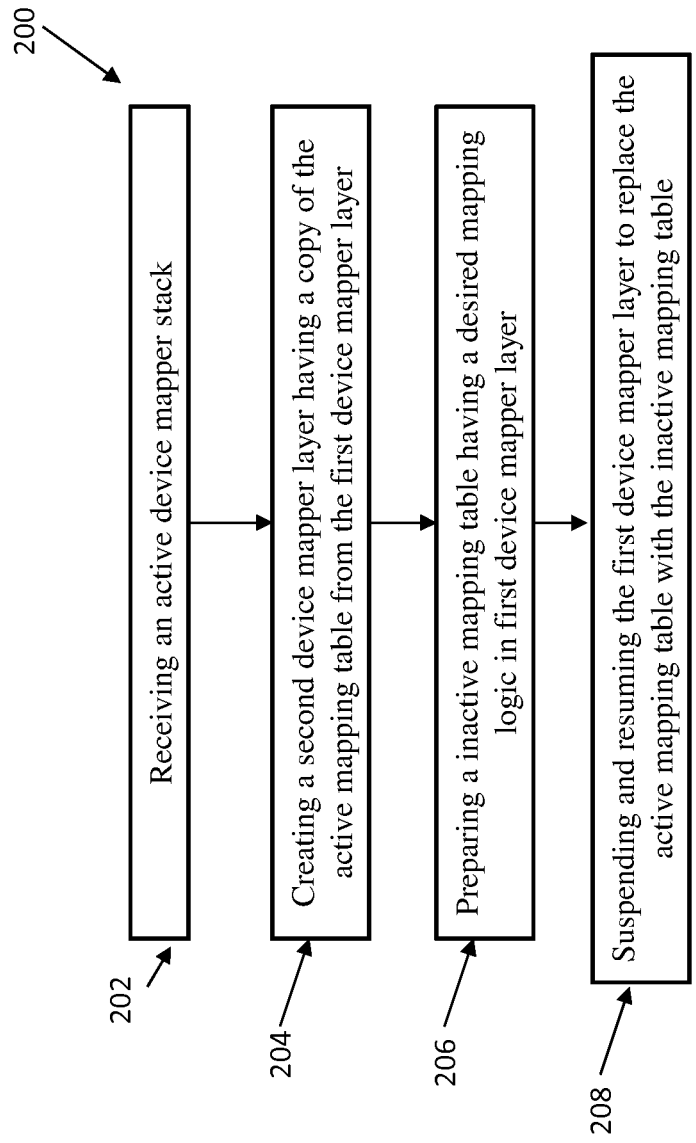
FIG. 2 depicts a process flow for non-disruptive modification of a device mapper stack by adding a device mapper layer to the device mapper stack in accordance with an exemplary embodiment.

Referring now to FIG. 2, a process flow of a method 200 for non-disruptive modification of a device mapper stack in accordance with an embodiment is illustrated. In exemplary embodiments, the method 200 can be used to modify an existing device mapper stack in a deployed system by adding a second device mapper layer. As illustrated at block 202, the method 200 begins by receiving an active device mapper stack. In exemplary embodiments, the active device mapper stack includes one or more applications, a first device mapper layer having an active mapping table, and a physical device. In exemplary embodiments, the active mapping table of the first device mapper layer includes a default, or original, mapping logic such as multipath logic.

Continuing with reference to FIG. 2, as shown at block 204, the method 200 includes creating a second device mapper layer having a copy of the active mapping table from the first device mapper layer. In exemplary embodiments, the second device mapper layer may be created by copying the first device mapper layer. As illustrated at block 206, the method 200 includes preparing an inactive mapping table having a desired mapping logic in first device mapper layer. Next, as shown at block 208, the method 200 includes suspending and resuming the first device mapper layer, which replaces the active mapping table with the inactive mapping table and discards the old active mapping table.

In exemplary embodiments, the copy, suspend and resume functions are all supported by existing Linux device mapper software. In exemplary embodiments, the desired mapping logic may include mapping logic that is not supported by, or present in, the default mapping logic. For example, the desired mapping logic may supplement or replace the data transfer between the virtual device and the physical device. For example, crypt typically specifies a trivial map, but supplements the write and read operations with encryption and decryption functions.

Figure 3:
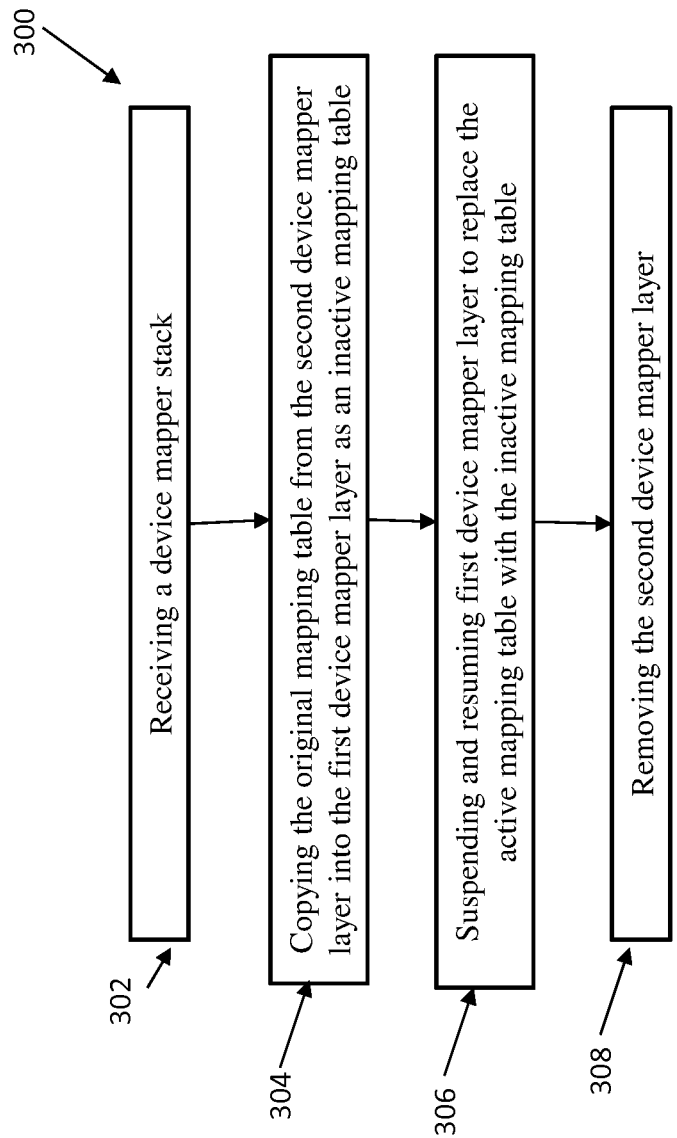
FIG. 3 depicts a process flow for non-disruptive modification of a device mapper stack by removing a device mapper layer from the device mapper stack in accordance with an exemplary embodiment.

Referring now to FIG. 3, a process flow of a method 300 for non-disruptive modification of a device mapper stack in accordance with an embodiment is illustrated. In exemplary embodiments, the method 300 can be used to restore an original stack configuration of a modified device mapper stack in a deployed system by removing a device mapper layer. As illustrated at block 302, the method 300 includes receiving a device mapper stack. The modified device mapper stack including one or more applications, a first device mapper layer having a modified mapping table, a second device mapper layer having an original mapping table, and a physical device. Next, as shown at block 304, the method includes copying the original mapping table from the second device mapper layer into the first device mapper layer and storing it as an inactive mapping table. As shown at block 306, the method 300 includes suspending and resuming first device mapper layer, which replaces the active mapping table, the modified mapping table, with the inactive mapping table, the original mapping table. As shown at block 308, the method 300 includes removing the second device mapper layer. In exemplary embodiments, by replacing the modified mapping table with the original mapping table the first device mapper layer directly references the physical device.

In exemplary embodiments, the copy, suspend and resume functions are all supported by existing Linux device mapper software.

Figure 4:
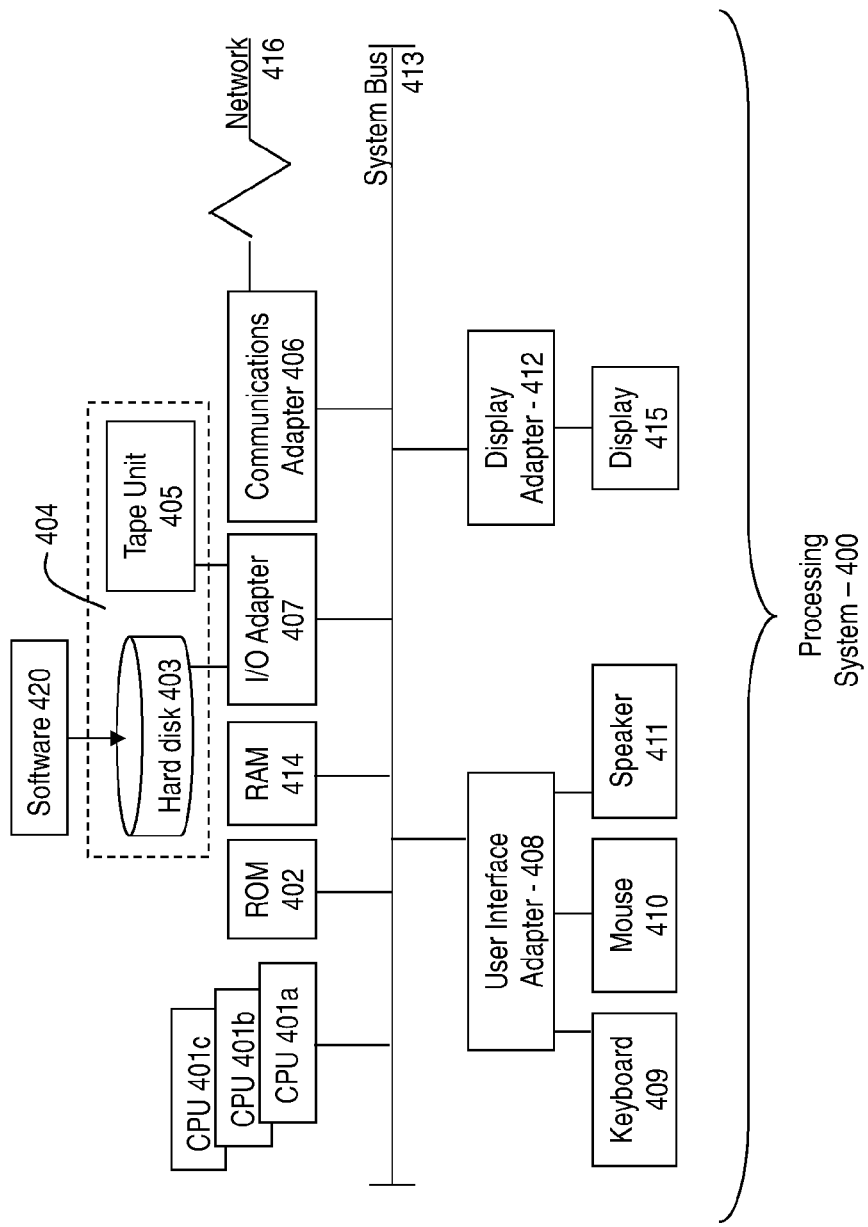
FIG. 4 depicts a processing system for practicing the teachings herein in accordance with an exemplary embodiment.

Referring to FIG. 4, there is shown an embodiment of a processing system 400 for implementing the teachings herein. In this embodiment, the system 400 has one or more central processing units (processors) 401a, 401b, 401c, etc. (collectively or generically referred to as processor(s) 401). In one embodiment, each processor 401 may include a reduced instruction set computer (RISC) microprocessor. Processors 401 are coupled to system memory 414 and various other components via a system bus 413. Read only memory (ROM) 402 is coupled to the system bus 413 and may include a basic input/output system (BIOS), which controls certain basic functions of system 400.

FIG. 4 further depicts an input/output (I/O) adapter 407 and a network adapter 406 coupled to the system bus 413. I/O adapter 407 may be a small computer system interface (SCSI) adapter that communicates with a hard disk 403 and/or tape storage drive 405 or any other similar component. I/O adapter 407, hard disk 403, and tape storage device 405 are collectively referred to herein as mass storage 404. Software 120 for execution on the processing system 400 may be stored in mass storage 404. A network adapter 406 interconnects bus 413 with an outside network 416 enabling data processing system 400 to communicate with other such systems. A screen (e.g., a display monitor) 415 is connected to system bus 413 by display adaptor 412, which may include a graphics adapter to improve the performance of graphics intensive applications and a video controller. In one embodiment, adapters 407, 406, and 412 may be connected to one or more I/O busses that are connected to system bus 413 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 413 via user interface adapter 408 and display adapter 412. A keyboard 409, mouse 140, and speaker 411 all interconnected to bus 413 via user interface adapter 408, which may include, for example, a Super I/O chip integrating multiple device adapters into a single integrated circuit.

Thus, as configured in FIG. 3, the system 400 includes processing capability in the form of processors 401, storage capability including system memory 414 and mass storage 404, input means such as keyboard 409 and mouse 140, and output capability including speaker 411 and display 415. In one embodiment, a portion of system memory 414 and mass storage 404 collectively store an operating system such as the AIX® operating system from IBM Corporation to coordinate the functions of the various components shown in FIG. 4.

Technical effects and benefits include allowing the modification of a device mapper stack of an active system such that the applications utilizing the active system are able to access the physical devices via the virtual device without disruption during the modification of the device mapper stack.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for non-disruptive modification of a device mapper stack comprising:
   receiving the device mapper stack comprising a first device mapper layer having an active mapping table;
   creating a second device mapper layer having a copy of the active mapping table from the first device mapper layer;
   creating an inactive mapping table having a desired mapping logic in the first device mapper layer; and
   suspending and resuming an operation of the first device mapper layer, wherein the suspending and resuming causes the active mapping table of the first device mapper layer to be replaced with the inactive mapping table of the first device mapper layer.

2. The method of claim 1, wherein the device mapper stack further comprises one or more applications configured to access a virtual device.

3. The method of claim 2, wherein the device mapper stack further comprises one or more physical devices which are mapped to the virtual device by the first device mapper layer and the second device mapper layer.

4. The method of claim 1, wherein the device mapper stack is configured to provide storage for a file system of an active computer system and wherein the modification of the device mapper stack does not disrupt an operation of the file system.

5. A method for non-disruptive modification of a device mapper stack comprising:
   receiving a device mapper stack comprising a first device mapper layer having an modified mapping table and a second device mapper layer having a original mapping table;
   copying the original mapping table from the second device mapper layer into the first device mapper layer;
   storing the original mapping table as an inactive mapping table for the first device mapper layer;
   suspending and resuming an operation of the first device mapper layer, wherein the suspending and resuming causes the active mapping table of the first device mapper layer to be replaced with the inactive mapping table of the first device mapper layer; and
   removing the second device mapper layer from the device mapper stack.

6. The method of claim 5, wherein the device mapper stack further comprises one or more applications configured to access a virtual device.

7. The method of claim 6, wherein the device mapper stack further comprises one or more physical devices which are mapped to the virtual device by the first device mapper layer and the second device mapper layer.

8. The method of claim 5, wherein the device mapper stack is configured to provide storage for a file system of an active computer system and wherein the modification of the device mapper stack does not disrupt an operation of the file system.

9. A computer program product for non-disruptive modification of a device mapper stack, the computer program product comprising:
   a non-transitory computer readable storage medium having program code embodied therewith, the program code executable by a processor to:
   receive the device mapper stack having a first device mapper layer comprising an active mapping table;
   creating a second device mapper layer having a copy of the active mapping table from the first device mapper layer;
   creating an inactive mapping table having a desired mapping logic in the first device mapper layer;
   suspending and resuming an operation of the first device mapper layer, wherein the suspending and resuming causes the active mapping table of the first device mapper layer to be replaced with the inactive mapping table of the first device mapper layer.

10. The computer program product of claim 9, wherein the device mapper stack further comprises one or more applications configured to access a virtual device.

11. The computer program product of claim 10, wherein the device mapper stack further comprises one or more physical devices which are mapped to the virtual device by the first device mapper layer and the second device mapper layer.

12. The computer program product of claim 9, wherein the device mapper stack is configured to provide storage for a file system of an active computer system and wherein the modification of the device mapper stack does not disrupt an operation of the file system.

* * * * *